June 23, 1942.　　J. E. BURKHARDT ET AL　　2,287,600
DEAERATOR AND FEED HEATER
Filed March 29, 1940　　8 Sheets-Sheet 1

Inventors
John E. Burkhardt
and Benjamin Fox.
By R. S. C. Dougherty.
Attorney

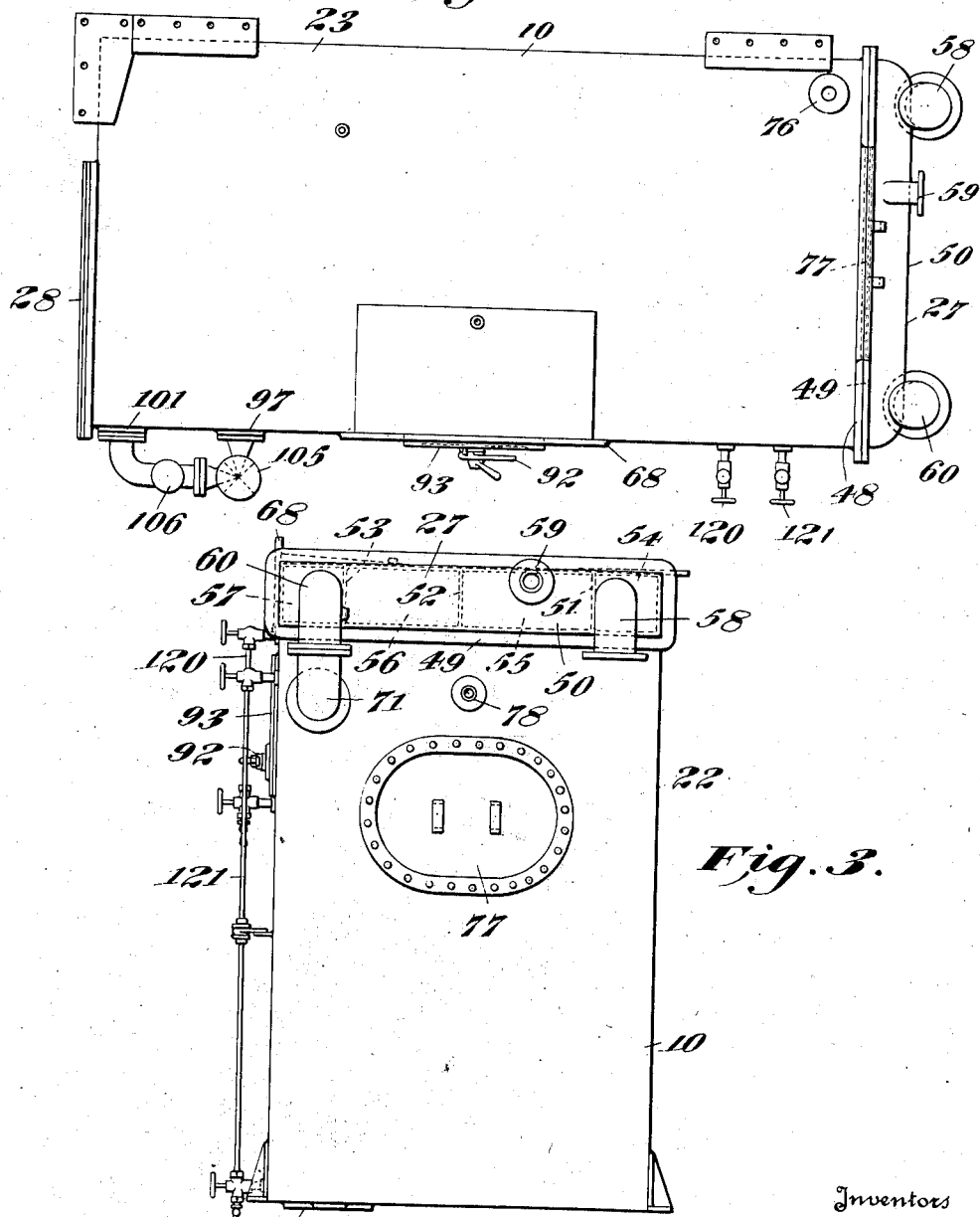

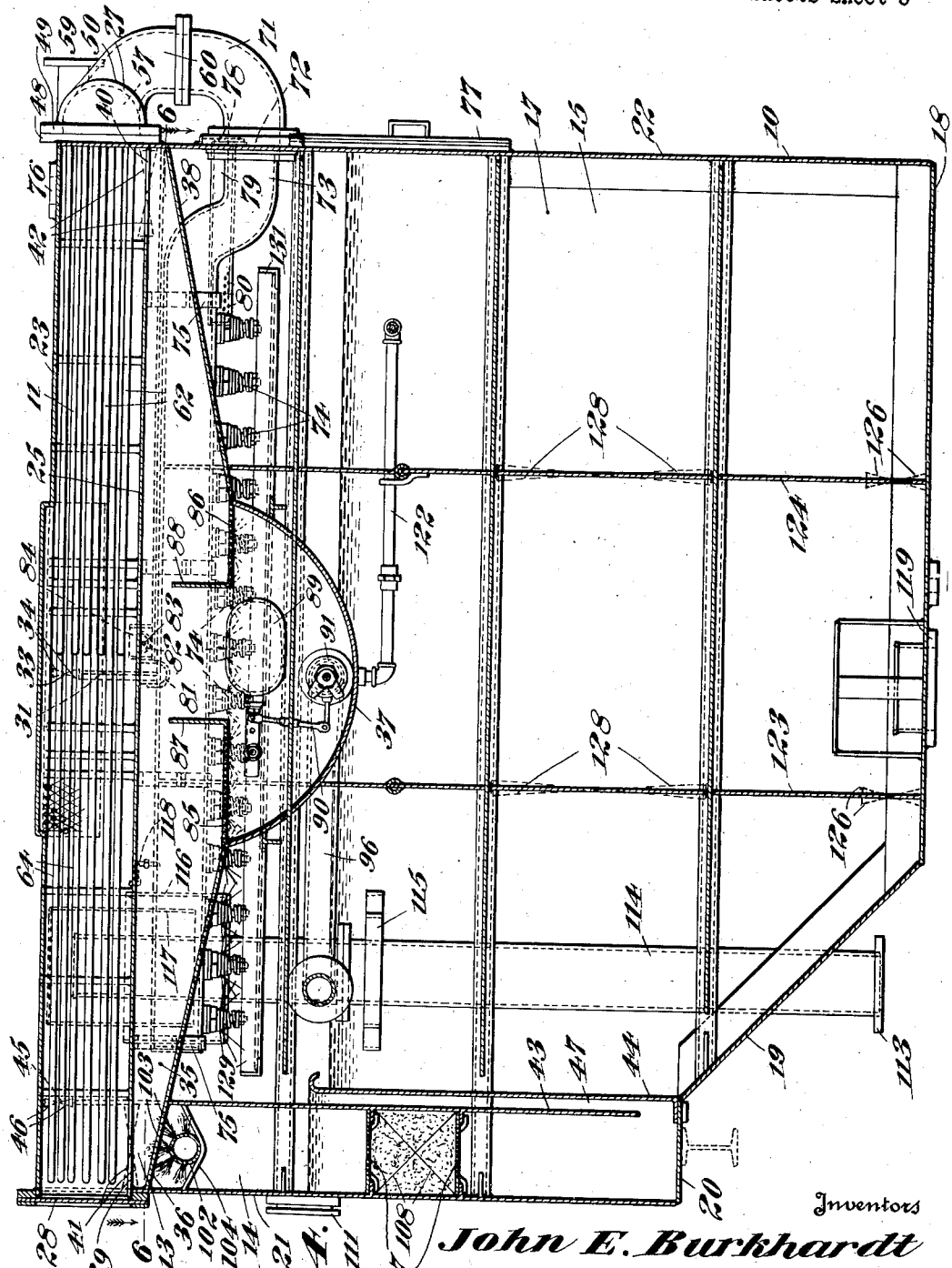

June 23, 1942. J. E. BURKHARDT ET AL 2,287,600
DEAERATOR AND FEED HEATER
Filed March 29, 1940 8 Sheets-Sheet 4

Inventors
John E. Burkhardt
and Benjamin Fox.
By R. S. A. Dougherty
Attorney

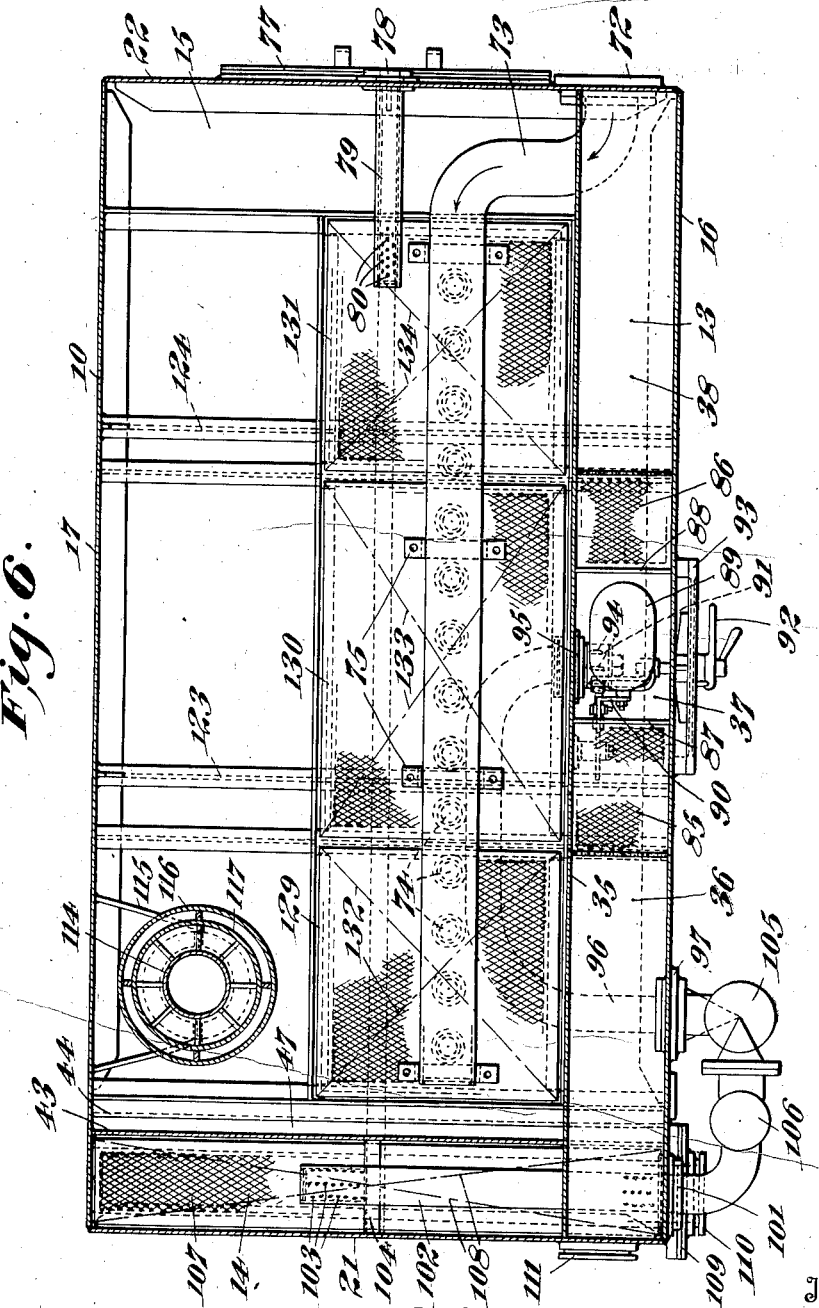

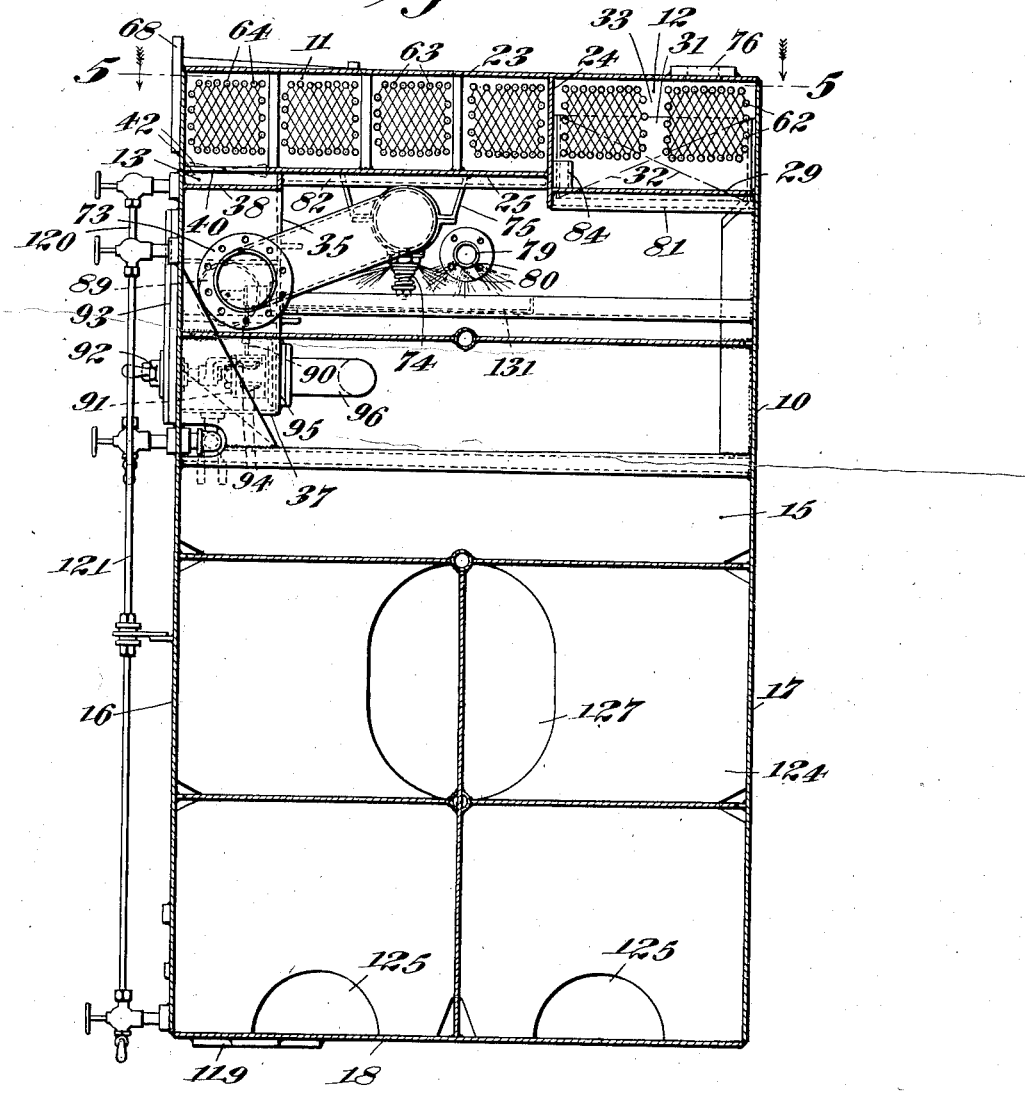

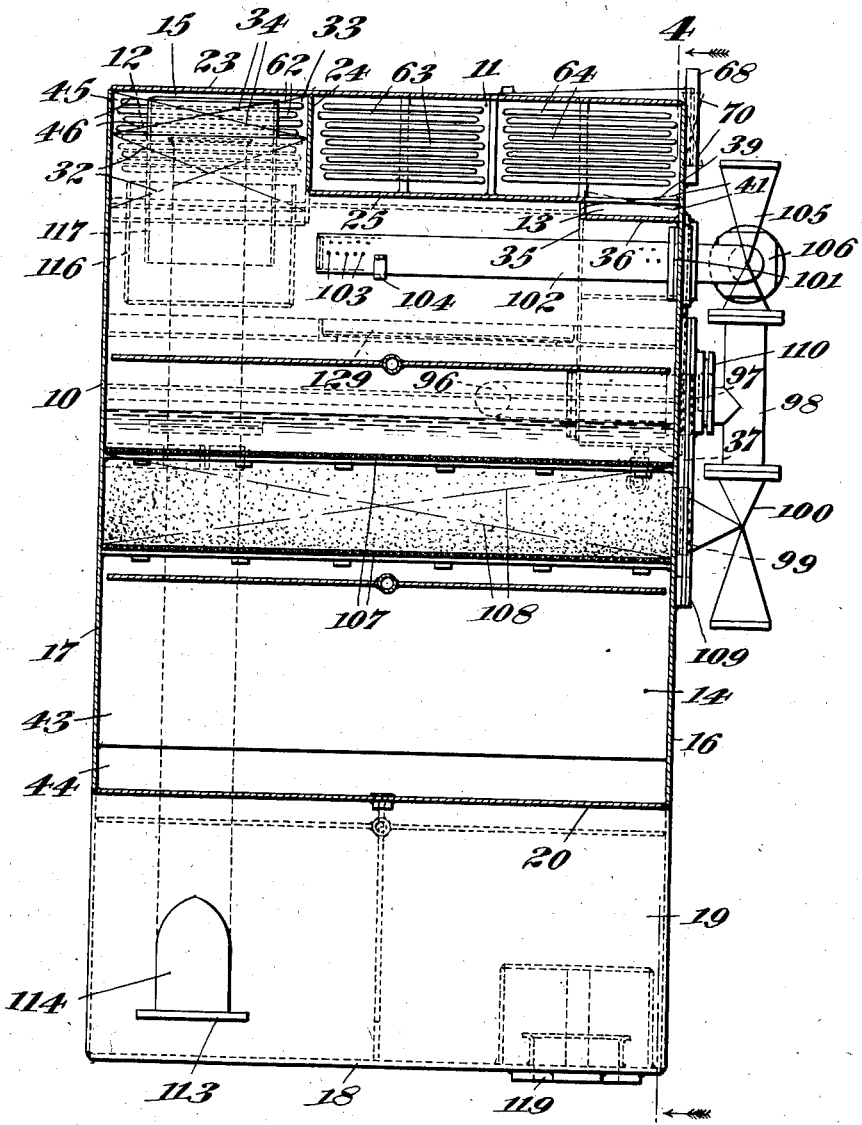

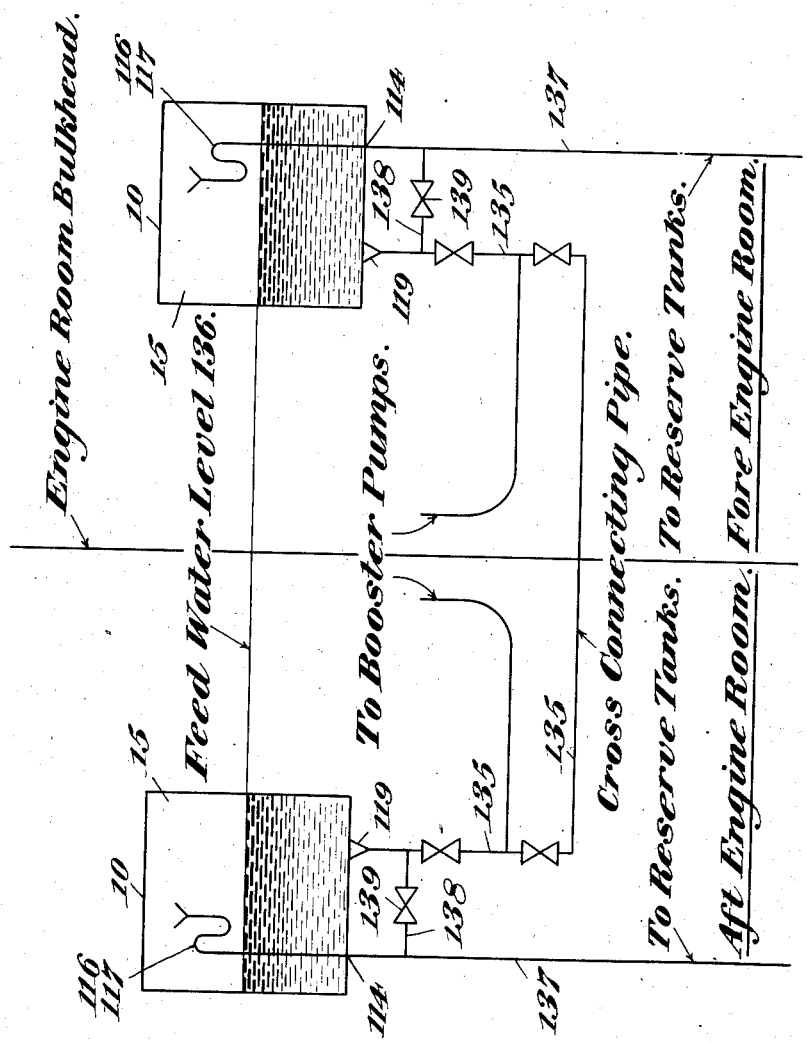

Patented June 23, 1942

2,287,600

UNITED STATES PATENT OFFICE 2,287,600

DEAERATOR AND FEED HEATER

John E. Burkhardt, Quincy, and Benjamin Fox, Wollaston, Mass., assignors to Bethlehem Steel Company, a corporation of Pennsylvania Application March 29, 1940, Serial No. 326,646

8 Claims. (Cl. 183—2.5)

This invention relates to an improved apparatus for deaerating and heating the feed water required for steam power plant purposes, and more particularly to such apparatus for use on board ships and the like where it is necessary to supply the feed water demands of the steam power plant system in the most efficient and economical manner as regards space and weight.

Heretofore apparatus of this description has comprised a plurality of units in the way of heaters, condensers, drain containers, surge tanks, and the like, each unit constituting, to a more or less degree, an individual unit requiring its own container, or casing, together with its piping and accessories, and occupying a space by itself. Such an arrangement has been very uneconomical, especially on ships, due to its excessive weight and space requirements, and moreover has been inefficient due to its greater exposure of radiation surface in the individual units and connecting piping. Therefore, it is the especial object of our invention to combine the various necessary units required for an apparatus for the deaerating and the heating of the feed water on board ships, and the like, into and upon a single shell container in such a manner that for each such apparatus there ensues as a result a considerable saving in costs, an increased efficiency of operation, and a reduction in the requirements of these two most important factors in design of all apparatus for ship use—weight and space.

Another object of my invention is to arrange the various necessary units required for an apparatus for the deaerating and the heating of the feed water within and upon the said single shell container with due regard for their sequential and co-operating relationships to the end that a further economy and efficiency of operation, and a further saving in weight and space results thereby.

A further object is to meet the demands of a ship's requirements for deaerating and heating of the feed water by installing a plurality of aforesaid unitary apparatuses and so cross-connecting them by means of intercommunicating piping that their operating contents of water and vapor are practically identical, as regards both volume and pressure, to the end that still further economy and efficiency of operation results thereby.

Other objects and advantages will be apparent from the following description wherein reference is made to the accompanying drawings illustrating the preferred embodiment of our invention and wherein similar reference numerals designate similar parts throughout the several views.

Fig. 2 is a plan view thereof;

Fig. 3 is an end elevation of the right-hand end of the apparatus as shown in Fig. 1;

Fig. 4 is a front elevation view such as would be revealed by a section taken along the line 4—4 of Fig. 8;

Fig. 6 is a section taken along the line 6—6 of Fig. 4 viewed in the direction of the arrows;

Fig. 7 is an end elevation of the right-hand end of the apparatus as shown in Fig. 1 such as would be revealed by a section taken along the line 7—7 of Fig. 1;

Fig. 8 is an end elevation of the left-hand end of the apparatus as shown in Fig. 1 such as would be revealed by a section taken along the line 8—8 of Fig. 1 and Fig. 9 is a diagrammatic plan of a part of the piping for our improved apparatus for a preferred installment on board ships.

Figure 1:
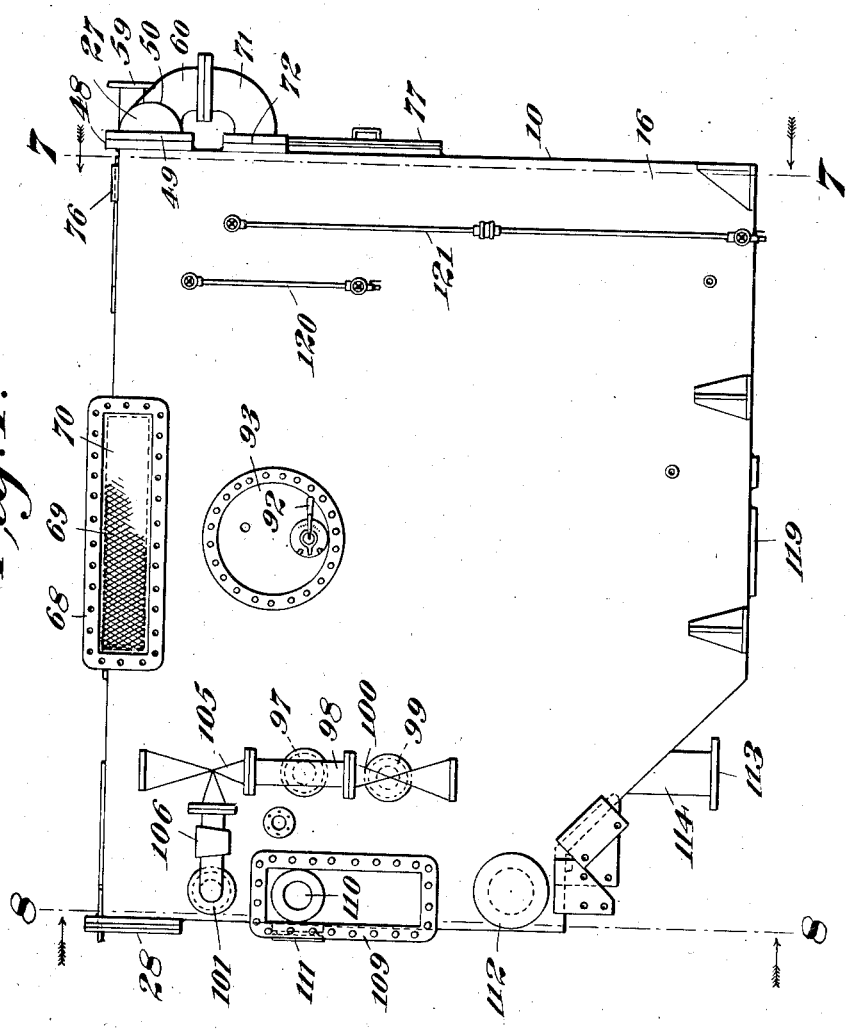
Figure 1 is a front elevation of our improved apparatus.

Referring now to the drawings the numeral 10 designates the container shell preferably constructed of steel plates properly reenforced and welded together to form a unitary container structure comprising therewithin a feed heater compartment 11, a vent condenser compartment 12, a feed heater drain compartment 13, a feed heater drain spray and filter compartment 14, and a surge tank and flash chamber compartment 15.

Comprising the main exterior plates of the container shell 10 are a front plate 16; a rear plate 17; bottom plates 18, 19 and 20; left end plate 21; right end plate 22, and a top plate 23.

The feed heater compartment 11 occupies the upper front full length portion of the container shell 10 and is open at both ends thereof. The enclosing walls of the feed heater compartment 11 comprise a top portion of the front plate 16; a full length front portion of the top plate 23; an intermediate partition plate 24; and a bottom partition plate 25 (indicated by crossed dot-and-dash lines 26 in Fig. 5). The open ends of the feed heater compartment 11 are normally closed by the vent condenser and feed heater cover 27, and the back cover 28.

The vent condenser compartment 12 occupies a portion of the upper rear full length portion of the container shell 10 and is open on the front end and partially open on the back end thereof.

Figure 5:
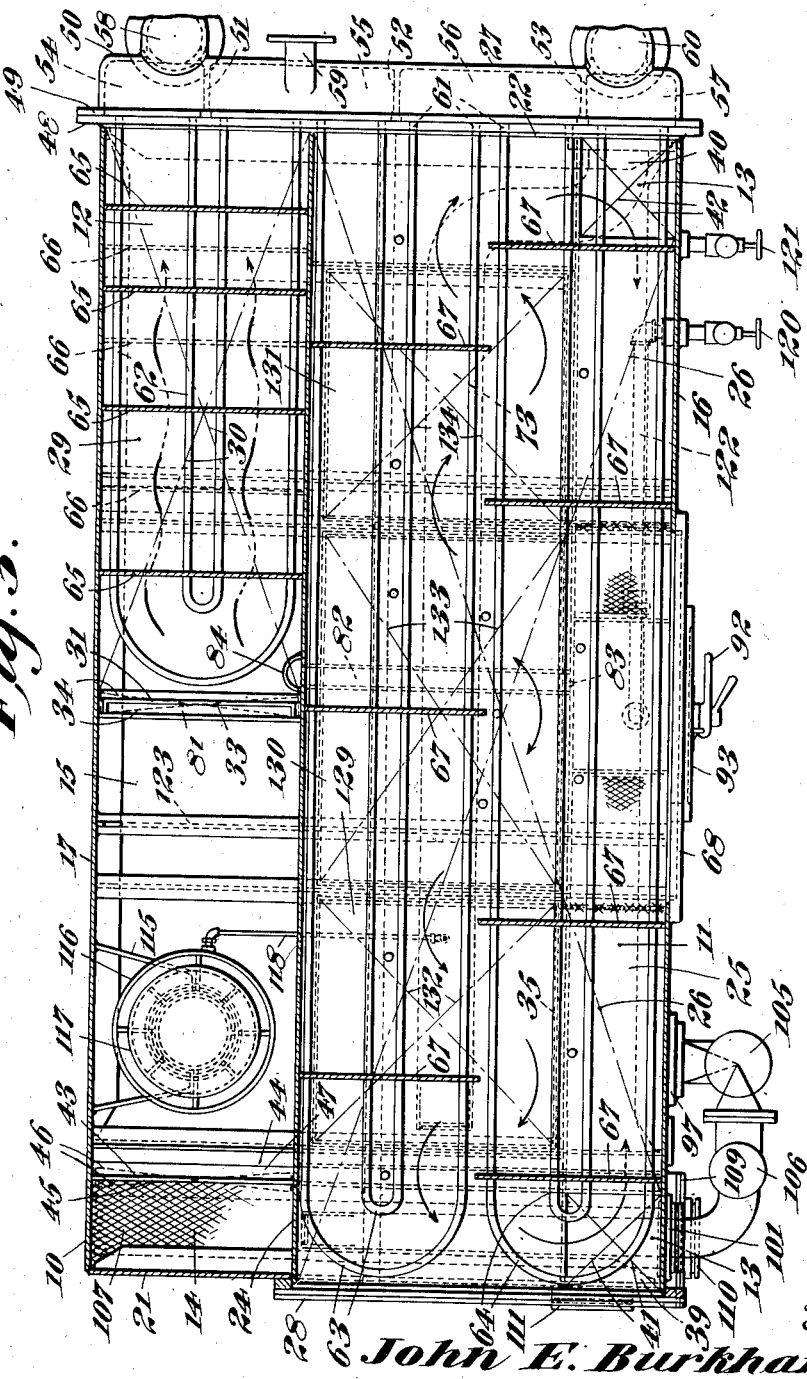
Fig. 5 is a plan view such as would be revealed by a section taken along the line 5—5 of Fig. 7.

The enclosing walls of the vent condenser compartment 12 comprise a top portion of the rear plate 17; a rear portion of the top plate 23; a portion of the intermediate partition plate 24; and a bottom partition plate 29 (indicated by crossed dot-and-dash lines 30 in Fig. 5). The open front end of the vent condenser compartment 12 is normally closed by the vent condenser and feed heater cover 27; and the rear end is partially closed by end partition plate 31 (indicated by crossed dot-and-dash lines 32 in Figs. 7 and 8), leaving an opening 33 (indicated by crossed dot-and-dash lines 34 in Figs. 4, 5, and 8) communicating with the surge tank and flash chamber compartment 15.

The feed heater drain compartment 13 lies just beneath the feeder heater compartment 11 and occupies a front full length portion of the container shell 10. The enclosing walls of the feed heater drain compartment 13 comprise a full length portion of the front plate 16; on top is a front portion of the bottom partition plate 25; a rear partition plate 35; the bottom partition plates 36, 37, and 38; and at the ends portions of left end plate 21 and the right end plate 22. The ends of the feed heater drain compartment 13 communicate with the feed heater compartment 11 by means of the openings 39 and 40 (indicated by the crossed dot-and-dash lines 41 and 42 respectively) in the bottom partition plate 25.

The feed heater drain spray and filter compartment 14 occupies a considerable portion of the left end portion of the container shell 10. The enclosing walls of the feed heater drain spray and filter compartment 14 comprise left end portions of the front plate 16 and the rear plate 17; the bottom plate 20; the left end plate 21; on top are portions of the top plate 23 and the bottom partition plates 25 and 36; and on the inside are spaced partition plates 43 and 44. The feed heater drain spray and filter compartment 14 communicates at the upper end thereof with the surge tank and flash chamber compartment 15 by means of the opening 45 (indicated by the crossed dot-and-dash lines 46); and in the lower part thereof communicates with the same compartment by way of the space 47 between the spaced partition plates 43 and 44.

The surge tank and flash chamber compartment 15 occupies the major portion of the container shell 10. The enclosing walls of this compartment 15 comprises major portions of the front plate 16 and the rear plate 17; the bottom plates 18 and 19; the major portion of the right end plate 22; on the left end are the spaced partition plates 43 and 44; and on the top are portions of the top plate 23 and the bottom partition plates 25 and 36, and the bottom partition plates 29, 37, and 38. As hereinbefore noted the surge tank and flash chamber compartment 15 communicate with the feed heater drain spray and filter compartment 14 through the opening 45 and through the space 47; and with the vent condenser compartment 12 through the opening 33.

The vent condenser and feed heater cover 27 is detachably attached by means of suitable devices such as bolts (not shown) to the tube sheet 48 preferably welded to cover the open right hand ends of the feed heater compartment 11 and the vent condenser compartment 12. The vent condenser and feed heater cover 27 is preferably a casting comprising the attaching flange 49 and exterior wall 50 of general semicircularly recessed cross-section. Partition walls 51, 52, and 53 form with the exterior wall 50 compartments 54, 55, 56, and 57. Communicating with the compartment 54 is flanged inlet connection 58, while communicating with the compartment 55 is flanged vent condenser recirculating connection 59, and communicating with the compartment 57 is flanged outlet connection 60.

The tube sheet 48 is provided with a plurality of openings 61 therein providing mountings for the tube ends of the vent condenser tube nest 62, and of the feed heater tube nests 63 and 64. As indicated in Figs. 4, 5, and 7 the tube nests 62, 63, and 64 are each made up in nest form comprising a plurality of hairpin tubes each tube having an inlet end and an outlet end. The inlet ends of the tubes comprising the tube nest 62 are all mounted in the tube sheet 48 so as to communicate with the compartment 54 of the cover 27, while the outlet ends are all mounted so as to communicate with the compartment 55. Similarly the inlet ends of the tubes of the tube nests 63 and 64 are mounted so as to communicate with the compartments 55 and 56, respectively, while the outlet ends thereof are mounted so as to communicate with the compartments 56 and 57. With this arrangement it is seen that there is continuous communication from the flanged inlet connection by way of compartment 54, tube nest 62, compartment 55, tube nest 63, compartment 56, tube nest 64, and compartment 57 with the flanged outlet connection 60. The tubes of the tube nest 62 in the vent condenser compartment 12 are supported by baffle plates 65 and 66 (shown only in Fig. 5). The baffles 65 contact the top, front, and rear walls of the vent condenser compartment 12 with their bottom edges spaced from the bottom wall thereof, while the baffles 66 contact the bottom, front and rear walls of vent condenser compartment 12 with their top edges spaced from the top wall thereof. In this manner vapors, or gases, passing through the vent condenser compartment 12 are forced to traverse a tortuous course therethrough over and under the baffles and in and around the tubes. In the feed heater compartment 11 the tubes of the tube nests 63 and 64 are supported on baffles 67 (shown only in Fig. 5). These baffles 67 are so arranged that they extend half way across the compartment 11 alternately from opposite sides in such a manner that vapors, or gases, passing through the feed heater compartment 11 are forced to traverse a tortuous course therethrough in and around the baffles and tubes.

The feed heater compartment 11 has communicating with it a flanged inlet connection 68 comprising a strainer plate 69 placed across its opening (indicated by crossed dot-and-dash lines 70 in Fig. 8).

The flanged outlet connection 60 of the cover 27 communicates by means of a flanged elbow 71 with a flanged opening 72 in the right end plate 22, which in turn communicates within the surge tank and flash chamber compartment with the feed heater spray pipe 73.

The feed heater spray pipe 73 is provided with a plurality of downwardly directed spray nozzles 74 and is additionally supported from the under side of the bottom partition plate 25 by means of a plurality of hangers 75.

At the right hand rear corner of the top plate 23 is the vent condenser flanged connection 76 which communicates with the vent condenser compartment 12.

On the right had end plate is a large opening communicating with the surge tank and flash chamber compartment 15 which is normally closed by means of the inspection door 77. Just above the door 77 is a flanged connection 78 communicating with the heating system drain spray pipe 79 within the compartment 15. The inner end of the pipe 79 is closed except for a plurality of small spray orifices 80 which communicate the spray pipe 79 with the interior of the surge tank and flash chamber compartment 15.

On the inner end of the vent condenser compartment 12 forming a water seal by-pass around the lower edge of the end partition plate 31 is water seal half-pipe 81. Half-pipe 81 forms an upwardly open-faced trough into which the lower edge of plate 31 partially projects, thus forming a water-seal through which condensates formed in compartment 12 may be discharged into compartment 15 as hereinafter described.

Extending across the middle portion of the bottom partition plate 25, on the under side, and within the compartment 15, is vent half-pipe 82 having its longitudinal edges welded gas-tight to plate 25 and its ends welded gas-tight to the rear partition plate 35 and the intermediate partition plate 24, respectively. Vent half-pipe 82 is communicated with the feed heater drain compartment 13 and with the vent condenser compartment 12 by means of small orifices 83 in the plates 35 and 24, respectively. Vertical half-pipe vent 84 straddles the orifice 83 in the plate 24 and has its vertical edges welded gas-tight to plate 24, and its lower end welded gas-tight to partition plate 29, all within the vent condenser compartment 12.

Within the feed heater drain compartment 13 the bottom partition plates 36 and 38 slope downward toward the center and at the juncture with the bottom partition plate 37 they are extended horizontally respectively by the strainer plates 85 and 86. The strainer plates 85 and 86 have as wash walls on their inner edges the vertical plates 87 and 88 respectively. Also mounted within the compartment 13 is the drain regulator ball float 89 connected by means of suitable linkage 90 to the automatic and manually operated regulating valve 91 having control lever 92 extending outwardly through the cover plate 93 in the front plate 16. The automatic and manually operated regulating valve 91 has controlled orifices 94 communicating the interior of the feed heater drain compartment 13 with the interior of the drain regulating valve 91. The valve 91 is suitably attached to the flanged connection 95 mounted on the rear partition plate 35 through which it communicates with the inlet end of drain pipe 96 mounted within the surge tank and flash chamber compartment 15. The outlet end of the drain pipe 96 is communicated with and attached to a flanged outlet connection 97 in the front plate 16. On the exterior of the front plate 16 and communicating with and attached to the flanged outlet connection 97 is the flanged T fitting 98. Just below the flanged outlet connection 97 is another flanged connection 99 attached to and communicating through the front plate 16 with the surge tank and flash chamber compartment 15 within. A flanged stop valve fitting 100 forms a communicating means between the T fitting 98 and the flanged connection 99. Also in the upper left hand corner of the front plate 16 is the flanged connection 101 attached thereto and communicating therethrough with a feed heater drain spray pipe 102 within the feed heater drain spray and filter compartment 14. The spray pipe 102 is closed on its inner end except for a plurality of spray orifices 103. The spray pipe 102 is further supported by the pipe hanger 104. The upper end of the flanged T fitting 98 is communicated with the flanged connection 101 by means of the flanged stop valve fitting 105 and the flanged check valve fitting 106.

Within the feed heater drain spray and filter compartment 14 mounted on the plates 21 and 43 are removable filter trays 107, the space between which (indicated by crossed lines 108 in Figs. 4, 6 and 8) is normally filled with a suitable filter material. Access is had to the filter space through an opening in the front plate 16 normally closed by the door plate 109. For the purpose of observation and illumination of the feed heater drain and compartment 14 windows are provided—one 110 in the door plate 109, and one 111 in the left end plate 21. Below the door plate 109 in the front plate 16 is an opening normally closed by the plate 112 communicating with the interior of the feed heater drain spray and filter compartment 14 for clean-out purposes.

Rising vertically through the bottom plate 19 with exterior flange fitting 113 is the overflow pipe 114 supported within the surge tank and flash chamber compartment 15 by means of pipe hanger 115. The upper end of the overflow pipe 114 is provided with a water seal means comprised of the overlapping cap members 116 and 117. Communicating the space within the cap member 116 with the feed heater spray pipe 73 is a small filling pipe 118.

Communicating with the interior of the surge tank and flash chamber compartment 15 through the bottom plate 18 is the flanged connection 119.

Mounted upon the front plate 16 are feed heater drain compartment gage glass 120 and the surge tank and flash chamber compartment gage glass 121. The gage glass 120 communicates with the bottom of the feed heater drain compartment 13 through the line pipe 122 within the compartment 15.

Within the surge tank and flash chamber compartment 15 are the spaced swash plates 123 and 124 each provided with openings 125 (indicated by crossed dot-and-dash lines 126 in Fig. 4) and 127 (indicated by crossed dot-and-dash lines 128 in Fig. 4). Also in compartment 15 supported just below the feed heater spray pipe 73 are spray strainer trays 129, 130, and 131 (indicated respectively in Figs. 5 and 6 by crossed dot-and-dash lines 132, 133, and 134).

We will now describe the preferred operation of our improved apparatus for deaerating and heating the feed water as required for steam power plant purposes on board ships. In the preferred installations our improved apparatus is installed on board ship in such a manner that it comprises the following characteristics: (a) The ship's deaerating and feed water heating requirements is preferably installed with a plurality of units 10 having their surge tank and flash chamber compartments 15 intercommunicated by way of the flanged connections 119 through cross connecting piping 135 in such a manner that the normal feed water level 136 in both the container shells 10 is at approximately the same level. (b) The feed water supply enters the apparatus at flanged inlet connection 58 through suitable piping means. (c) Steam required for the apparatus is suitably supplied to the flanged inlet connection 68. (d) The vent from the vent condenser compartment 12 through flanged connection 76 is piped to a suitable discharge point into the atmosphere. (e) The flanged connection 114 is suitably communicated by means of piping 137 with reserve feed water tanks (not shown in Fig. 9), and with cross connecting piping 135 through piping 138 and control valve 139. (f) Drains from the ship's steam system are suitably communicated with the flanged inlet connection 78.

In operation the feed water to be deaerated and heated comprises condensate and make-up water from the power plant condenser which has passed through the air ejector inter-and-after condenser and reaches the vent condenser water compartment 54 through flanged inlet connection 58 at a temperature preferably not less than 80° F. and not more than 95° F. The feed water enters the water compartment 54 under pump pressure and is circulated through the tube nest 62 in the vent condenser compartment 12 to the water compartment 55 from which it continues to circulate under pressure through the first stage tube nest 63, water compartment 56, and second stage tube nest 64 to the water compartment 57 of the feed heater compartment 11. In passing from the water compartment 54 to the water compartment 57 the feed water has gradually been heated, as will be hereinafter described, and it passes on through the flanged outlet connection 60, flanged elbow 71, and flanged opening 72 to the feed heater spray pipe 73. The feed water at this point is preferably heated to a minimum temperature of not less than 216° F. and a maximum temperature of not more than 240° F. The water passes downwardly from the feed heater spray pipe 73 through the spray nozzles 74 into the surge tank and flash chamber compartment 15. Due to variable operating conditions it is desirable to have the spray nozzles 74 suitably graduated to discharge at increasing pressures say from 3 pounds gage pressure above atmosphere to about 15 pounds gage pressure above atmosphere, thus keeping the velocity of the sprays high for better atomization. At full power all the sprays come into action. As the feed water (heated under pressure from 216° F. to 240° F.) is discharged into the surge tank and flash chamber compartment 15, the latter being under atmospheric pressure, a portion thereof is immediately flashed into steam. The flash is about 4/10 of 1% of the total for 216° F. and about 2.8% of the total for 240° F. This flash vapor carries with it all the air in the feed water if the latter is thoroughly atomized. The perforated trays 129, 130, and 131 act as baffles to deflect the steam liberated by the flash. The unvaporized water sprayed upon the perforated trays 129, 130, and 131 filters through the perforations and drops into the storage space of the tank compartment 15 below.

Condensate from the ship's heating system drains is pumped to the spray pipe 79 under pressure and is also sprayed into the surge tank and flash chamber compartment 15 through the small spray orifices 80, and, as in the case of the feed water, a portion is flashed into steam thus liberating the remaining air carried in the condensate, and the unvaporized portion drops downward to the storage space below. The uncondensed vapors and liberated air resulting from the flashing of the heated feed water and the condensate from the ship's heating system within the surge tanks and flash chamber compartment 15 will be again hereinafter referred to.

The heating of the feed water in its passage from the water compartment 54 to the spray nozzles 74 is accomplished as follows: Steam is admitted to the apparatus through flanged inlet connection 68 at a pressure of not less than 5 pounds gage nor more than 15 pounds gage and at temperatures ranging from 240° F. to 250° F. The steam passes through the perforated plate 69 which prevents it from impinging injuriously upon the tubes 64 within the feed heater compartment 11. The steam entering the feed heater compartment 11 through the perforated plate 69 flows forward and to the right and left of the inlet connection 68 through the compartment 11, being tortuously diverted therethrough by reason of the baffles 67, over and around the tubes of the tube nests 63 and 64, until, as condensate and as inert and uncondensed vapors, it passes through the openings 39 and 40 at the ends of the compartment 11 to the feed heater drain compartment 13 beneath. The steam in thus passing through the feed heater compartment 11 over and around the tube nests 63 and 64 has of course transferred a considerable portion of its heat to the feed water passing through the tube nests 63 and 64 as has been hereinbefore described. By arranging the steam inlet connection 68 at a central position lengthwise of the feed heater compartment 11 with outlet flow toward each end to openings 39 and 40 an assured efficiency of drainage of the condensate is assured regardless of the roll of the ship.

The condensate and remaining vapors from the feed heater compartment 11 passing through the openings 39 and 40 into the feed heater drain compartment 13 are there separated—the condensate falling upon the sloping bottom partition plates 36 and 38 flows downward through the strainer plates 85 and 86 into the centrally depressed bottom portion of the feed heater drain compartment 13, while the remaining uncondensed vapors are by-passed through the orifices 83, half-pipe 82, and half-pipe vent 84 into the vent condenser compartment 12. The condensate gathered in the bottom portion of the feed heater drain compartment 13 is under the control of the drain regulator ball float 89 and valve 91, and is under the pressure existing within the compartments 11 and 13 by reason of the inlet steam therein. By reason of this pressure and valve control the condensate is automatically (or manually as desired) discharged from the compartment 13 to the feed heater drain spray and filter compartment 14 through the orifices 94, valve 91, pipe 96, T fitting 98, stop valve fitting 105, check valve fitting 106, spray pipe 102, and spray orifices 103. When discharging condensate to the feed heater drain spray and filter compartment 14 the stop valve 100 is closed. For emergency purposes the condensate from the feed heater drain compartment 13 may be discharged directly into the surge tank and flash chamber compartment 15, and when this is desired the stop valve 105 is closed, and the stop valve 100 is opened, whereupon the condensate flows through the flanged connection 99 directly into the surge tank and flash chamber compartment 15. The condensate discharged into the feed heater drain spray and filter compartment 14 (the latter being under atmospheric pressure) through the spray orifices 103 has a proportion thereof immediately flashed into steam which carries with it the air carried in the condensate. The uncondensed vapors pass upward and leave the compartment 14 through the opening 45 into the upper partition of the surge tank and flash chamber compartment 15. The condensate falls into the lower storage portion of the compartment 14 and is automatically maintained at a predetermined level with excess thereof discharged into the surge tank and flash chamber compartment 15 by reason of the spaced partition plates 43 and 44 forming the communicating space 47. Any oil that may have been carried with the steam entering the inlet connection 68 and carried along with the condensate therefrom is filtered out by the filter material carried between the filter trays 107 as the condensate passes therethrough on its way to the compartment 15.

The uncondensed vapors and liberated air discharged from the feed heater drain spray and filter compartment 14 and that resulting from the flashing of the heated feed water and of the condensate from the ship's heating system, as hereinbefore described, gathers in the top portion of the compartment 14 and flows into the vent condenser compartment 12 through the opening 33 in the partition plate 31. Here, in the vent condenser compartment 12, the vapors are diverted by reason of the baffles 65 and 66 over and around the tube nest 62 and are finally condensed in heating the incoming feed water within the tubes of the tube nest 62. The remaining inert gases pass outward to the atmosphere through the flanged connection 76. The condensate formed falls to the floor of the compartment 12, and drains to its inner end, and passes through the water seal half-pipe 81 to fall into the storage space of the surge tank and flash chamber compartment 15.

The overflow pipe 114 with its water seal members 116 and 117 assures ample emergency overflow provision to reserve feed tank without automatic devices or the necessity for manual operation of valves. The small filling pipe 118 leading from the feed heater spray pipe 73 to the cap member 116 assures a sufficient supply of water at all times to maintain the water seal in operable condition.

As hereinbefore stated, the preferred installation of our improved apparatus for deaerating and heating the feed water required for steam power plant purposes on board ships, and the like, is to install a plurality of such apparatuses and to cross-connect them, as diagrammatically shown in Figure 9, by means of inter-communicating piping so that equalization of water levels in the different apparatuses is obtained. This is of extreme importance in an arrangement of two engine rooms each having its own deaerating and feed water heating apparatus. With a plurality of apparatuses cross-connected as shown in Figure 9 they operate as a single unit as regards control of the water level therein. It is obvious that thus cross-connected feed water may be added to or withdrawn from either tank 15 individually but not without proportionately affecting the water level in the other tank 15. For instance, opening either of the discharge valves 139 (when cross-connection line is open) in lines 138 will discharge feed water from both tanks 15 equally. Similarly, with discharge valves 139 closed (and cross-connection line open) any feed water added to either tank 15 will proportionately affect the water level in the other tank 15. By means of the cross-connection control of the water level in both tanks 15 may thus be maintained from either engine room, thus gaining further efficiency and economy in operation.

It will now be apparent that we have devised a novel apparatus for deaerating and heating the feed water required for steam power plant purposes, more particularly for use on board ships, and the like, but it will be manifest that it is useful and valuable for application to other fields. It will be readily seen from the above description that we have devised a novel heat exchange and deaerating apparatus whereby the surface areas subject to heat radiation losses are reduced to a minimum by the placing of heaters, condensers, drain containers, tanks, and the like within a single container. We have done this in such a manner that there is a logical sequential and co-operating relationship of the various units whereby the flow of both heating vapor and feed water to be heated is carried forward in a most economical and efficient manner. The heating vapor units are all arranged in the upper part of the container 10, while the incoming feed water passes first therethrough and then by means of pressure and the action of gravity finds its way to the storage space of the apparatus in the bottom portion thereof, while at the same time the incoming steam and generated vapors flow sequentially and logically through the intercommunicated upper compartments against this incoming flow of feed water. This results in gradually lowered temperatures, final condensation, and ultimate dissipation of the incoming and generated heating vapors, and in gradually increasing temperature of and deaerating of the feed water up to the point of storage for use within the container unit 10. We have in so doing also made a considerable saving in the cost and weight of individual containers and piping required, all of which makes for general compactness of design with its consequent saving in space and weight—thus complying with the most valuable desideratum in the ship building art.

Although we have described and illustrated our invention in considerable detail, we do not wish to be limited to the exact and specific details thereof as shown and described, but may use such modification in, substitution for or equivalent thereof, as are embraced within the scope of our invention or as pointed out in the claims.

Having thus described our invention, what we claim as new and desire to secure by Letters Patent is:

1. In an apparatus for deaerating and heating feed water, a single container comprising: a secondary heat exchange compartment having inlet means adapted for supplying a heating fluid thereto; a condensate collecting compartment having inlet means for receiving condensate and vapor from said secondary heat exchange compartment; a condensate deaerating compartment having fluid conveying conduit means for receiving condensate from said condensate collecting compartment adapted to discharge the same into said condensate deaerating compartment in comminuted streams; a feed water deaerating and storing compartment having vapor inlet means for receiving vapor from said condensate deaerating compartment, condensate liquid seal inlet means for receiving condensate from said condensate deaerating compartment, a feed water emergency overflow discharge means, and a feed water storage discharge means; a primary heat exchange compartment having fluid conveying conduit means for receiving vapor from said feed water deaerating and storing compartment, fluid conveying conduit means for receiving vapor from said condensate collecting compartment, condensate liquid seal outlet means for discharging condensate into said feed water deaerating and storing compartment, and outlet means adapted to communicate the same with the atmosphere; and means for conducting feed water to be heated and deaerated successively in heat exchange relation with vapor in said primary heat exchange compartment, and with vapor in said secondary heat exchange compartment, and then into a discharge means adapted to discharge feed water in a plurality of comminuted streams within said feed water deaerating and storing compartment.

2. In an apparatus for deaerating and heating feed water, a single container comprising: a secondary heat exchange compartment having inlet means adapted for supplying a heating fluid thereto; a condensate collecting compartment having inlet means for receiving condensate and vapor from said secondary heat exchange compartment; a condensate deaerating compartment having fluid conveying conduit means for receiving condensate from said condensate collecting compartment adapted to discharge the same into said condensate deaerating compartment in comminuted streams; a feed water deaerating and storing compartment having vapor inlet means for receiving vapor from said condensate deaerating compartment, condensate liquid seal inlet means for receiving condensate from said condensate deaerating compartment, a feed water emergency overflow discharge means, and a feed water storage discharge means; a primary heat exchange compartment having fluid conveying conduit means for receiving vapor from said feed water deaerating and storing compartment, fluid conveying conduit means for receiving vapor from said condensate collecting compartment, condensate liquid seal outlet means for discharging condensate into said feed water deaerating and storing compartment, and outlet means adapted to communicate the same with the atmosphere; means for conducting feed water to be heated and deaerated successively in heat exchange relation with vapor in said primary heat exchange compartment, and with vapor in said secondary heat exchange compartment, and then into a discharge means adapted to discharge said feed water in a plurality of comminuted streams within said feed water deaerating and storing compartment; and means for conducting preheated water to be deaerated into a discharge means adapted to discharge said preheated water in comminuted streams within said feed water deaerating and storing compartment.

3. In an apparatus for deaerating and heating feed water, a single container comprising: a secondary heat exchange compartment having inlet means adapted for supplying a heating fluid thereto; a condensate collecting compartment having inlet means for receiving condensate and vapor from said secondary heat exchange compartment; a condensate deaerating compartment comprising filter means therein and having fluid conveying conduit means for receiving condensate from said condensate collecting compartment adapted to discharge the same into said condensate deaerating compartment above said filter means in comminuted streams; a feed water deaerating and storing compartment having vapor inlet means for receiving vapor from said condensate deaerating compartment, condensate liquid seal inlet means for receiving condensate from said condensate deaerating compartment, a feed water emergency overflow discharge means, and a feed water storage discharge means; a primary heat exchange compartment having fluid conveying conduit means for receiving vapor from said feed water deaerating and storing compartment, fluid conveying conduit means for receiving vapor from said condensate collecting compartment, condensate liquid seal outlet means for discharging condensate into said feed water deaerating and storing compartment, and outlet means adapted to communicate the same with the atmosphere; and means for conducting feed water to be heated and deaerated successively in heat exchange relation with vapor in said primary heat exchange compartment, and with vapor in said secondary heat exchange compartment, and then into a discharge means adapted to discharge said feed water in a plurality of comminuted streams within said feed water deaerating and storing compartment.

4. In an apparatus for deaerating and heating feed water, a single container comprising: a secondary heat exchange compartment having inlet means adapted for supplying a heating fluid thereto; a condensate collecting compartment having inlet means for receiving condensate and vapor from said secondary heat exchange compartment; a condensate deaerating compartment comprising filter means therein and having fluid conveying conduit means for receiving condensate from said condensate collecting compartment adapted to discharge the same into said condensate deaerating compartment above said filter means in comminuted streams; a feed water deaerating and storing compartment having vapor inlet means for receiving vapor from said condensate deaerating compartment, condensate liquid seal inlet means for receiving condensate from said condensate deaerating compartment, a feed water emergency overflow discharge means, and a feed water storage discharge means; a primary heat exchange compartment having fluid conveying conduit means for receiving vapor from said feed water deaerating and storing compartment, fluid conveying conduit means for receiving vapor from said condensate collecting compartment, condensate liquid seal outlet means for discharging condensate into said feed water deaerating and storing compartment, and outlet means adapted to communicate the same with the atmosphere; means for conducting feed water to be heated and deaerated successively in heat exchange relation with vapor in said primary heat exchange compartment, and with vapor in said secondary heat exchange compartment, and then into a discharge means adapted to discharge said feed water in a plurality of comminuted streams within said feed water deaerating and storing compartment; and means for conducting preheated water to be deaerated into a discharge means adapted to discharge said preheated water in comminuted streams within said feed water deaerating and storing compartment.

5. In an apparatus for deaerating and heating feed water, a single container comprising: a secondary heat exchange compartment; a condensate collecting compartment; a condensate deaerating compartment; a feed water deaerating and storing compartment; and a primary heat exchange compartment; said heat exchange compartments occupying adjacent, co-planar, substantial portions of the topmost stratum of said container, and each having inlet means adapted for supplying a heating fluid thereto, and comprising means for conducting feed water to be heated and deaerated successively in heat exchange relation with vapors in said heat exchange compartments respectively and then into a discharge means adapted to discharge said feed water in a plurality of comminuted streams within said feed water deaerating and storing compartment beneath the floor of said secondary heat exchange compartment; said condensate collecting compartment comprising a liquid storing portion lying adjacent to, beneath, and in direct communication with said secondary heat exchange compartment, and fluid conveying conduit means adapted to convey condensate from said liquid storing portion to condensate discharge means adapted to discharge said condensate within said condensate deaerating compartment in comminuted streams; said condensate deaerating compartment comprising a liquid storing portion lying beneath said condensate discharge means, and a vapor collecting portion thereabove co-planar with said heat exchange compartments; said feed water deaerating and storing compartment comprising a liquid storing portion in the lower portion of said single container, having condensate liquid seal inlet means for receiving condensates from said condensate deaerating compartment and from said primary heat exchange compartment, feed water emergency overflow discharge means, and a feed water storage discharge means, and a vapor collecting portion thereabove partially co-planar with said heat exchange compartments and in direct communication with the said vapor portion of said condensate deaerating compartment and in direct communication with said primary heat exchange compartment through one of said inlet means thereto; and said primary heat exchange compartment having fluid conveying conduit means for receiving vapor from said condensate collecting compartment, and outlet means adapted to communicate the same with the atmosphere.

6. In an apparatus for deaerating and heating feed water, a single container comprising: a secondary heat exchange compartment; a condensate collecting compartment; a condensate deaerating compartment; a feed water deaerating and storing compartment; and a primary heat exchange compartment; said heat exchange compartments occupying adjacent, co-planar, substantial portions of the topmost stratum of said container, and each having inlet means adapted for supplying a heating fluid thereto, and comprising means for conducting feed water to be heated and deaerated successively in heat exchange relation with vapors in said heat exchange compartments respectively and then into a discharge means adapted to discharge said feed water in a plurality of comminuted streams within said feed water deaerating and storing compartment beneath the floor of said secondary heat exchange compartment; said condensate collecting compartment comprising a liquid storing portion lying adjacent to, beneath, and in direct communication with said secondary heat exchange compartment, and fluid conveying conduit means adapted to convey condensate from said liquid storing portion to condensate discharge means adapted to discharge said condensate within said condensate deaerating compartment in comminuted streams; said condensate deaerating compartment comprising a liquid storing portion lying beneath said condensate discharge means, and a vapor collecting portion thereabove co-planar with said heat exchange compartments; said feed water deaerating and storing compartment comprising a liquid storing portion in the lower portion of said single container, having condensate liquid seal inlet means for receiving condensates from said condensate deaerating compartment and from said primary heat exchange compartment, feed water emergency overflow discharge means, and a feed water storage discharge means, and a vapor collecting portion thereabove partially co-planar with said heat exchange compartments and in direct communication with the said vapor portion of said condensate deaerating compartment and in direct communication with said primary heat exchange compartment through one of said inlet means thereto, and comprising means for conducting preheated water to be deaerated into a discharge means adapted to discharge said preheated water in comminuted streams within said feed water deaerating and storing compartment; and said primary heat exchange compartment having fluid conveying conduit means for receiving vapor from said condensate collecting compartment, and outlet means adapted to communicate the same with the atmosphere.

7. In an apparatus for deaerating and heating feed water, a single container comprising: a secondary heat exchange compartment; a condensate collecting compartment; a condensate deaerating compartment; a feed water deaerating and storing compartment; and a primary heat exchange compartment; said heat exchange compartments occupying adjacent, co-planar, substantial portions of the topmost stratum of said container, and each having inlet means adapted for supplying a heating fluid thereto, and comprising means for conducting feed water to be heated and deaerated successively in heat exchange relation with vapors in said heat exchange compartments respectively and then into a discharge means adapted to discharge said feed water in a plurality of comminuted streams within said feed water deaerating and storing compartment beneath the floor of said secondary heat exchange compartment; said condensate collecting compartment comprising a liquid storing portion lying adjacent to, beneath, and in direct communication with said secondary heat exchange compartment, and fluid conveying conduit means adapted to convey condensate from said liquid storing portion to condensate discharge means adapted to discharge said condensate within said condensate deaerating compartment in comminuted streams; said condensate deaerating compartment comprising a liquid storing portion having a filter means therein lying beneath said condensate discharge means, and a vapor collecting portion thereabove co-planar with said heat exchange compartments; said feed water deaerating and storing compartment comprising a liquid storing portion in the lower portion of said single container, having condensate liquid seal inlet means for receiving condensates from said condensate deaerating compartment and from said primary heat exchange compartment, feed water emergency overflow discharge means, and a feed water storage discharge means, and a vapor collecting portion thereabove partially co-planar with said heat exchange compartments and in direct communication with the said vapor portion of said condensate deaerating compartment and in direct communication with said primary heat exchange compartment through one of said inlet means thereto;

and said primary heat exchange compartment having fluid conveying conduit means for receiving vapor from said condensate collecting compartment, and outlet means adapted to communicate the same with the atmosphere.

8. In an apparatus for deaerating and heating feed water, a single container comprising: a secondary heat exchange compartment; a condensate collecting compartment; a condensate deaerating compartment; a feed water deaerating and storing compartment; and a primary heat exchange compartment; said heat exchange compartments occupying adjacent, co-planar, substantial portions of the topmost stratum of said container, and each having inlet means adapted for supplying a heating fluid thereto, and comprising means for conducting feed water to be heated and deaerated successively in heat exchange relation with vapors in said heat exchange compartments respectively and then into a discharge means adapted to discharge said feed water in a plurality of comminuted streams within said feed water deaerating and storing compartment beneath the floor of said secondary heat exchange compartment; said condensate collecting compartment comprising a liquid storing portion lying adjacent to, beneath, and in direct communication with said secondary heat exchange compartment, and fluid conveying conduit means adapted to convey condensate from said liquid storing portion to condensate discharge means adapted to discharge said condensate within said condensate deaerating compartment in comminuted streams; said condensate deaerating compartment comprising a liquid storing portion having a filter means therein lying beneath said condensate discharge means, and a vapor collecting portion thereabove co-planar with said heat exchange compartments; said feed water deaerating and storing compartment comprising a liquid storing portion in the lower portion of said single container, having condensate liquid seal inlet means for receiving condensates from said condensate deaerating compartment and from said primary heat exchange compartment, feed water emergency overflow discharge means, and a feed water storage discharge means, and a vapor collecting portion thereabove partially co-planar with said heat exchange compartments and in direct communication with the said vapor portion of said condensate deaerating compartment and in direct communication with said primary heat exchange compartment through one of said inlet means thereto, and comprising means for conducting preheated water to be deaerated into a discharge means adapted to discharge said preheated water in comminuted streams within said feed water deaerating and storing compartment; and said primary heat exchange compartment having fluid conveying conduit means for receiving vapor from said condensate collecting compartment, and outlet means adapted to communicate the same with the atmosphere.

JOHN E. BURKHARDT.
BENJAMIN FOX.